United States Patent [19]

Crane

[11] 4,199,840

[45] Apr. 29, 1980

[54] SCRAPER BLADE STRUCTURE FOR MEAT CLEANING MACHINE

[75] Inventor: Herbert R. Crane, Tipp City, Ohio

[73] Assignee: Hobart Corporation, Troy, Ohio

[21] Appl. No.: 730,135

[22] Filed: Oct. 6, 1976

Related U.S. Application Data

[63] Continuation of Ser. No. 566,366, Apr. 9, 1975, abandoned.

[51] Int. Cl.² .............................................. A22C 17/00
[52] U.S. Cl. ........................................... 17/16; 17/1 G
[58] Field of Search ............................. 17/1 G, 16, 18; 15/3.17, 93 R

[56] References Cited

U.S. PATENT DOCUMENTS

| | | | |
|---|---|---|---|
| 2,044,179 | 6/1936 | Middaugh | 17/16 |
| 2,826,772 | 3/1958 | Smith | 15/3.17 |
| 3,256,555 | 6/1966 | Paoli | 17/1 G |
| 3,439,369 | 4/1969 | Russell | 15/3.17 |
| 3,478,380 | 11/1969 | Russell | 15/3.17 |
| 3,606,628 | 9/1971 | Russell | 15/3.17 |
| 3,857,131 | 5/1973 | Russell | 15/3.17 |

FOREIGN PATENT DOCUMENTS 220077 9/1909 Fed. Rep. of Germany ............ 17/1 G

*Primary Examiner*—Louis G. Mancene
*Assistant Examiner*—Paul J. Hirsch
*Attorney, Agent, or Firm*—Biebel, French & Nauman

[57] ABSTRACT

The section modulus of elasticity of the body portions of the scraper blades in a meat scraping machine decrease substantially uniformly outwardly along each blade. The blades have flat, transversely flexible scraping edges on the ends opposite a common series of circular hubs. Each hub is slightly rotated with respect to the adjacent hub to provide a series of spiraling blade-like edges for engaging and scraping accumulated residues from the sawed surface of a piece of meat. An adjustable doctor blade removes the residue from the scraper blades. The uniformly decreasing section modulus of elasticity of each blade encourages uniform flexing along the length of each blade to distribute stresses and fatigue uniformly throughout the blade material. The blades are pre-flexed on the hubs to reduce the effective diameter of the blade structure and to reduce the flexing of the blades when encountering the meat and the doctor blade.

5 Claims, 12 Drawing Figures

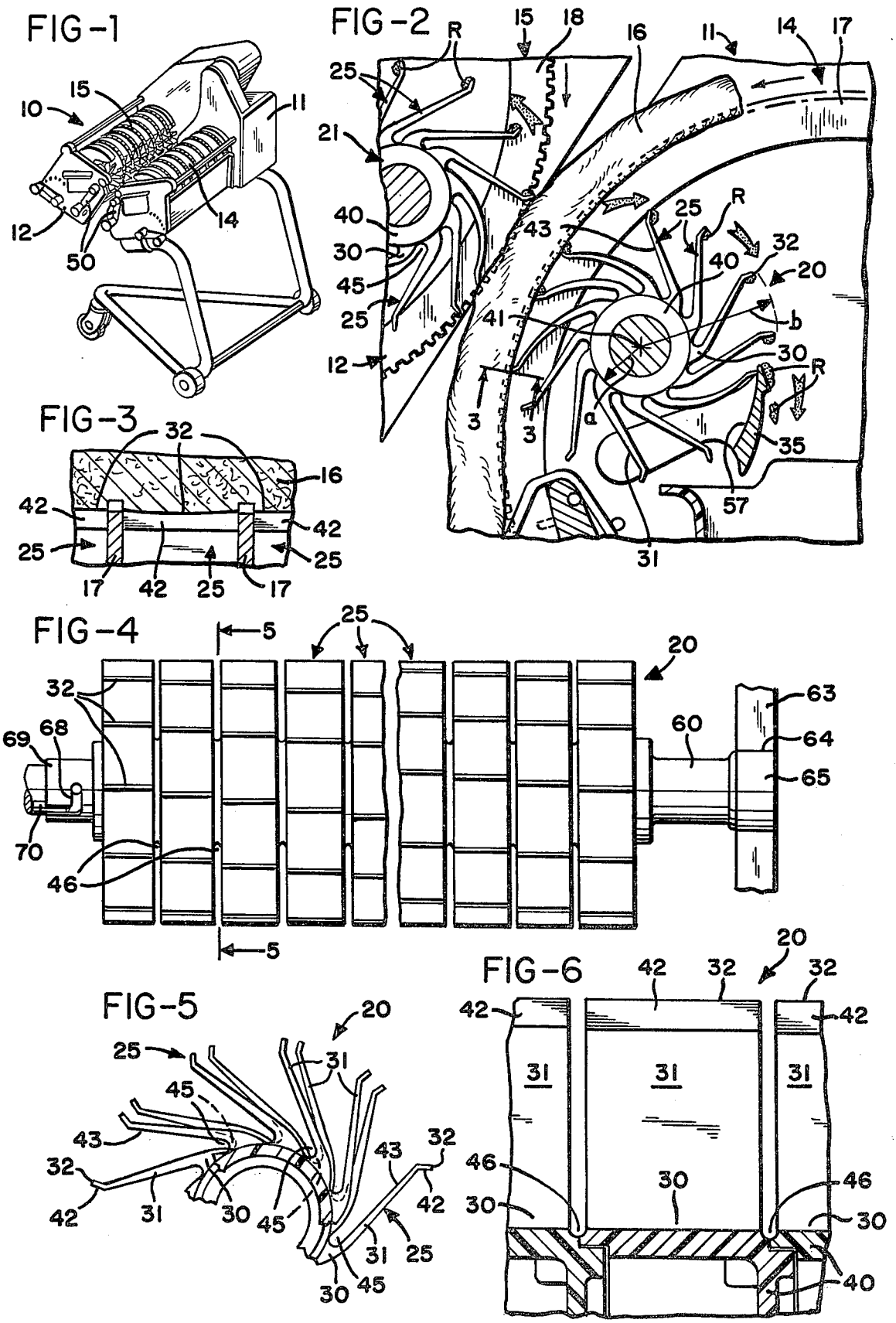

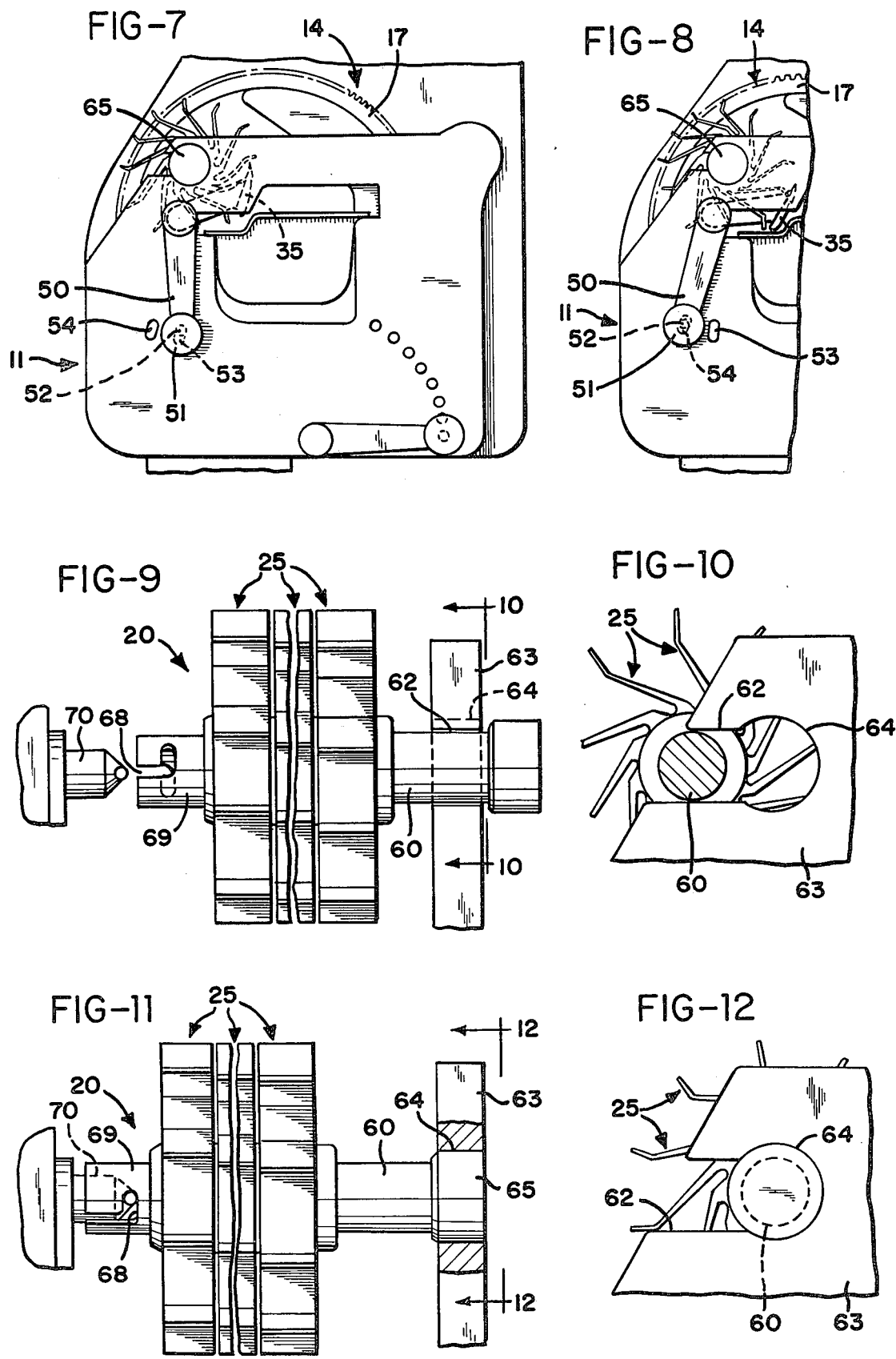

SCRAPER BLADE STRUCTURE FOR MEAT CLEANING MACHINE

This is a continuation of application Ser. No. 566,366 filed Apr. 9, 1975, now abandoned.

CROSS REFERENCE TO RELATED APPLICATIONS

Reference is made to copending U.S. applications Ser. No. 535,037, filed Dec. 20, 1974, now U.S. Pat. No. 3,977,035 and Ser. No. 535,041, filed Dec. 20, 1974, now abandoned both assigned to the assignee of the present invention.

BACKGROUND OF THE INVENTION

This invention relates to meat scraping machines for scraping the freshly sawed surfaces of a piece of meat, and more particularly to a scraper blade for engaging and scraping the sawed surfaces of the meat to remove accumulated residues from the meat as the meat is driven through the machine.

The faces of sawed meat have been cleaned customarily for reasons of sanitation and appearance. Sawing usually leaves residues of coagulated blood, bone dust, marrow, meat particles, fat, and so on, which may be unappealing to customers as they view the meat in the market. It has therefore been common practice to scrape and clean the freshly sawed meat before it is put on display.

In view of the time and labor involved in manually scraping each piece of meat, it has long been desirable to automate this process. Until recently, however, most efforts have been unsuccessful. Foremost among the causes have been the problems of accommodating meats of all sizes and thicknesses, and of meeting the very strict sanitation requirements of the Federal Department of Agriculture (FDA), the National Sanitation Foundation (NSF), and various state agencies. A successful machine must therefore be highly versatile, thorough, and quick, and it must also be completely sanitary in operation and quickly and easily cleanable after use.

Meat scraping machines such as disclosed in U.S. Pat. Nos. 3,389,414; 3,439,369; 3,478,380; 3,606,628; 3,781,936; 3,857,131; and 3,862,682 represent significant improvements in automating the scraping of sawed meats and reduce the manual labor and time heretofore necessary. U.S. Pat. No. 3,781,936, in particular, discloses a meat scraping machine which has solved a number of prior art problems. It scrapes both faces of the meat automatically and quickly, and accepts the commonly encountered thicknesses. Most of the manual labor has been eliminated, and the machine produces a product which is highly appealing to the consumer.

Other patents of interest include U.S. Pat. Nos. 2,817,862; 2,929,088; 2,826,772; 2,154,187; 2,314,700; 2,753,590; 1,670,809; 3,102,290; and 3,579,697.

SUMMARY OF THE INVENTION

The present invention is directed to improvements in meat scraping machines such as those mentioned above, and in particular to an improved, highly sanitary, highly effective, and highly durable scraper blade which may be used in manually controlled, semi-automatic, or fully automatic meat scraping machines. A fully automatic machine is illustrated, particular details of which may be found in the copending applications mentioned above.

In the illustrated machine, the meat is driven between two simultaneously rotating cylinders, each of which is actually a series of coaxial spaced gripping rings which engage and drive the meat through the machine. The scraper blades are mounted on circular hubs within the meat driving cylinders and are positioned to project between and beyond the meat gripping rings. The scraper blades engage and scrape the sawed surfaces of the meat as it is moved through the machine by the cylinders. The scraper blade hubs are connected coaxially with one another, one for each space between the cylinder rings. This series of hubs forms a scraper blade assembly, and each hub in the assembly is slightly rotated with respect to its adjacent hub so that the respective blades are slightly offset to form a spiral along the scraper blade assembly. The spiral distributes the engaging and releasing action of the blades along the blade assembly to reduce the shock which would result from aligned rows of blades engaging the meat simultaneously. This reduces noise and power pulses.

After the blades have scraped the residue from the meat surface, they rotate past an adjustable doctor blade. The doctor blade scrapes the residue from the scraper blades and drops it into a scrap pan for later removal.

Each scraper blade has a flat, blade-like scraping edge on the end opposite the hub for engaging, scraping, and cleaning the sawed meat surface. The broad, blade-like scraping edge is particularly effective in removing unwanted residue, and at the same time is easily cleanable for purposes of sanitation. The effectiveness of the blades is further enhanced by making each of the blade-like scraping edges flexible across the width of the blade at the scraping edge, that is, along the length of the scraping edge, so as to follow the contour of the meat surface being scraped. Each of the scraper blades is formed of a plastic material suitable for use in food processing machinery.

Although the blades are each unitary, single pieces, they may be viewed as consisting of three portions, a body or spring member attached to a base near the hub, and a scraping edge at the tip of the spring member. The scraping edge is at the edge of a square or rectangular scraping surface having its long axis parallel to the axis of rotation of the hub. The surface is arranged to lie roughly in a radial plane, which is a plane containing the axis of rotation of the hub. However, the radial orientation of the scraping surface is not critical, and it can be inclined with the outer edge considerably forward or somewhat backward from the radial. A slightly forward disposition is preferable. The scraping surface may also be somewhat convex or concave in the radial direction.

The scraping surface has two functional elements. The intersection of the scraping surface with the outside surface at the tip of the blade forms a sharp corner, the scraping edge, which rubs against the meat causing the residues to collect on the scraper blade. This intersection may either be a straight line parallel to the axis of rotation or preferably convex relative to the axis.

The spring member portion of the blade connects the scraping edge to the base of the blade near the hub. It is arranged so that it is relatively flexible both in the direction of rotation and in a radial direction, but is relatively stiff with respect to force parallel to the axis of rotation.

With many materials, it is desirable to minimize the blade stresses, flexing, vibration, and so on in order to enhance fatigue strength, operational effectiveness, and compactness. This is accomplished in the present invention by fabricating the spring or body portion of each blade so that it has a section modulus of elasticity which decreases substantially uniformly outward along the blade, preferably as a function of the distance from the blade base. Thus, each blade has a base by which it is mounted to an appropriate support, such as the circular hubs in the illustrated embodiment. The blade body portion extends away from the blade base and terminates in the flat, blade-like scraping edge at the blade end opposite the base. The section modulus of elasticity may then be decreased in this manner either by keeping a constant blade width and decreasing the thickness of the blade in a manner approximating a parabolic section, or by using a constant cross section with a variable width, as by using a nearly triangular hole in the center of the blade. With the first method the blade thickness becomes less and less at greater distances outward from the base. The second method provides a progressively larger opening on the face of a blade of uniform thickness, so that the "effective" width of the blade (i.e., the width of the material at a given location) becomes narrower. Other means for graduating the section modulus of elasticity may also be employed, of course.

Since a scraper blade is flexed twice per revolution, once when encountering the meat and again when encountering the doctor blade, the substantially uniformly decreasing section modulus of elasticity is particularly important in increasing blade longevity. Analytically, the longevity is increased, the point stresses uniformly distributed, and the fatigue and stresses within the blades reduced, as follows. When a blade is caused to flex by the application of a force at the blade scraping edge, the force or bending moment tending to bend the blade at a given point along its length will be a function of the distance from that point to the scraping surface edge. This distance represents the moment arm tending to cause the bending. Thus the greater the distance from the scraping edge, the greater the resulting bending force and the greater the spring constant necessary to resist this force. The present invention varies the modulus of elasticity as required to provide the desired spring constant at each point, so that the actual deflection of the blade is distributed uniformly along its length.

Stressing and fatigue of the scraper blades is also reduced by inclining portions of the blade backward from the radial so that the blades, in one sense, are "preflexed". That is, the blades are not formed along radial lines perpendicularly outward from the hubs, but leave the hubs at an angle and are asymmetrical with respect to any radial plane of the hub. (A radial plane of the hub, as mentioned earlier, is a plane containing the axis of rotation of the hub.) Thus the blades, when at rest, do not approach the meat perpendicularly but instead follow a longer path than the shortest path from the blade base to the sawed meat surface when the blade base is opposite the meat surface. This further reduces the flexing of the blades and reduces the distance between each hub and the meat surface, so that a longer blade may be used within a given diameter to reduce even further the flexing, and hence stresses, at any given point on each blade. The ends of the blades at the blade scraping edge, however, are disposed almost perpendicularly to the meat, or preferably slightly more advanced, to engage the meat surface at an acute angle which increases to an obtuse angle as the blade engages and moves along the meat to work under the residue and scrape it away from the meat.

As the scraper blades scrape the meat, they pick up particles of the residue, which then stick or adhere to the blade near the tip of the scraping surface. As the blade rotates beyond the contact area with the meat, it engages the doctor blade which has a relatively thin front edge which is arranged so that it is contacted by the scraper blade at a point slightly below the area of the scraper blade surface to which the residue is adhering. Since the leading edge of the doctor blade blocks further forward motion of the scraper blade tip, the body or spring section of the scraper blade flexes in such a way that this scraping blade surface is pulled in a nearly radial direction along the edge of the doctor blade while at the same time being held firmly against the edge. This wiping action causes the residue to be transferred to the top surface of the doctor blade. Residue from successive scraping blades striking the doctor blade push the previously deposited residues along the top surface of the doctor blade until it reaches the back edge of the doctor, where it falls into a collecting container.

The doctor blade can be of any convenient shape as long as it is wide enough to prevent the residue from being redeposited on the scraper blades or on the meat.

Scraper blade fatigue is reduced by tapering the doctor blade so the scraper blades are released slowly and continuously, rather than snapped free. Were the blades allowed to snap free, considerable fatigue would result from the consequent vibrational stresses. The doctor blade may also be moved out of engagement with the scraper blades when the machine is not scraping meat so that the scraper blades will not be flexed unnecessarily by the doctor blade. A crank arm moves the doctor blade in and out of engagement with the scraper blades, and an adjustable eccentric pin on the end of the crank arm provides for precise adjustment of the degree of doctor blade engagement with the scraper blades.

For improved sanitation, the blades have been designed and arranged to eliminate closed pockets, crevices, and other recesses where residues might collect. The junctions between the blades are smooth, curved, and open, for easy and thorough cleaning. The spiral offset of each blade hub with respect to adjacent hubs is very slight so that the transverse open spaces on each hub are substantially aligned with those of the adjacent hubs. This aids in eliminating unsanitary pockets, allowing visual inspection, and providing easy access by cleaning devices.

It is therefore an object of this invention to provide an improved scraper blade structure for cleaning the sawed surfaces of a piece of meat; a structure particularly well adapted for use in automated meat scraping machines; a scraper blade which is highly effective in removing the accumulated residue from the sawed face of a piece of meat; which has an extended service life; which avoids concentration of stresses and fatigue; a structure which has small, compact dimensions without reduction in the effective lengths of the scraper blades; which is easily maintainable in a clean and sanitary condition; and to provide all of these advantages in a structure which is inexpensive and readily suited for easy and convenient fabrication.

Other objects and advantages of the invention will be apparent from the following description, the accompanying drawings and the appended claims.

BRIEF DESCRIPTION OF THE DRAWINGS

FIG. 1 is a perspective view of a meat scraping machine incorporating the scraper blade structure of the present invention;

FIG. 2 is a fragmentary cross-sectional view of a sawed piece of meat being scraped by the machine of FIG. 1;

FIG. 3 is a fragmentary cross-sectional view taken on line 3—3 of FIG. 2;

FIG. 4 is a foreshortened view of a scraper blade assembly incorporating the scraper blades of the present invention;

FIG. 5 is a cross-sectional view taken on line 5—5 of FIG. 4;

FIG. 6 is a fragmentary cross-sectional view showing the structure of individual blade and hub sections of the FIG. 4 scraper blade assembly, and illustrating the manner in which they are joined;

FIG. 7 is an end view of a portion of the right hand section of the FIG. 1 machine, showing the doctor blade held in engagement with the scraper blades by the doctor blade crank arm;

FIG. 8 is a similar view of a portion of FIG. 7, showing the doctor blade moved out of engagement;

FIG. 9 is a greatly foreshortened view similar to FIG. 4 showing an initial step in the insertion of the scraper blade assembly into the FIG. 1 machine;

FIG. 10 is a cross-sectional view taken on line 10—10 of FIG. 9;

FIG. 11 is a view similar to FIG. 9 showing the scraper blade assembly inserted into the machine, and FIG. 12 is a cross-sectional view taken on line 12—12 of FIG. 11.

DESCRIPTION OF THE PREFERRED EMBODIMENT

FIG. 1 shows a meat scraping machine 10 incorporating the scraper blades of the present invention. Machine 10 includes a stationary right hand section 11 and a left hand section 12 mounted for gravitationally induced pivotal movement toward section 11.

Sections 11 and 12 include respective meat gripping and moving cylinders 14 and 15 for rotating inwardly and downwardly to carry a slice of meat 16 (FIG. 2) between the two sections for a scraped cleaning of the sawed faces thereof. Each of cylinders 14 and 15 is defined by individual, co-axial, blade-like meat gripping and moving rings 17 and 18 which engage and move the meat through machine 10.

A right hand scraper blade assembly 20 and a left hand scraper blade assembly 21 are mounted on the right and left hand sections, respectively, so that their individual scraper blades 25 project between the rings 17 and 18 of cylinders 14 and 15 (FIG. 2) to engage and scrape the sawed surfaces of the piece of meat 16. Since the present invention is directed to particular details of the structure of the scraper blades 25, and since these blades may be used in many different meat cleaning applications, particular details of the meat scraping machine 10 will not be presented in this description. Reference is made to copending U.S. applications Ser. No. 535,037, filed Dec. 20, 1974, and Ser. No. 535,041, filed Dec. 20, 1974 for more detailed descriptions of machine 10.

Each of the scraper blades 25 includes a base portion 30 and a flexible, relatively stiff, elongated scraper blade body or spring portion 31 extending away from the base portion 30. A flat, blade-like scraping edge 32 is on one end of body portion 31 opposite the base portion 30. As may be seen in the figures, each body portion 31 has a decreasing thickness approaching the scraping edge 32. The thickness of the body portion 31 decreases in a predetermined manner, depending on the material, outward from the base 30, so that the modulus of elasticity measured at any given point along the blade body portion 31 will decrease in substantially uniform manner outward from the base 30 and toward the scraping edge 32. As discussed above, and with particular reference to FIG. 2, this uniformly changing modulus of elasticity will cause uniform flexing of the blade body portion 31 along its entire length when it engages the sawed surfaces of the piece of meat 16 or the doctor blade 35. This distributes the flexing stresses in a uniform manner throughout the blade body portion 31 so that no particular region is subject to undue fatigue.

The blades 25 may be mounted upon any appropriate support having any desired configuration. In the preferred embodiment the blades are mounted on a circular hub 40, and in fact are formed integrally therewith as part of a single molded structure. (See FIG. 6).

In order to form the scraper blade assemblies 20 and 21, a series of such hubs 40 are stacked together in interfitting relation (FIG. 6) and spin welded together. Each hub 40 is welded to its adjacent hub slightly rotated about their common axis 41 (FIG. 2) to define a spiraling series of scraper blades along the scraper blade assembly (FIG. 4).

The blades 25 are "bent backwards" around their corresponding hubs 40 (FIGS. 2 and 5) so that they do not follow radial lines outward from the hubs. Rather, the body portions 31 of the blades are generally tangent to their hubs near their bases 30. Thus the blades are not perpendicular to the meat surface or to the blade hubs (compare FIGS. 2 and 5). This is to reduce the flexing of the blades upon engagement with and release from the meat surface. Since the blades are already disposed backwards at a considerable angle, a reduction in the amount of flexing of the blades is accomplished. That is, the configuration permits the blades to yield a greater amount in the radial direction for the same amount of flexure of the blades 25, so that there is less actual flexing of the blade body portions 31 than there would be if the unflexed blades tended to be perpendicular to the meat.

The configuration of the blades along non-perpendicular (non-radial) lines or paths between the hubs 40 and the meat 16 also reduces the distance between each hub and the blade scraping edges 32 opposite the hub. This reduces the effective diameter of each of the scraper blade assemblies 20 and 21, for a given blade length, as may be seen in FIG. 2. Put another way, the blades are longer than the difference of b minus a (FIG. 2), where a is the hub radius and therefore the distance from the hub assembly axis of rotation 41 to the bases 30 of the scraper blades, and b is the distance from the scraping edges 32 to the axis 41.

Since the scraper blades 25 follow longer paths to the sawed meat surface than the shortest radial paths, the very end portions 42 of the blades are bent to turn them more or less parallel to radial lines extending outwardly from the hub, so that each is generally tangent to a radial plane of the hub. The rear sides 43 of the blades 25 are thus convex so that the end portions 42 are more or less perpendicular to the sawed meat surfaces. In the preferred embodiment, these portions are actually turned a little bit farther so that as they approach the about-to-be-scraped meat surface the respective scraping edges 32 work under the residue R on the meat and effectively "scoop" it away as the blade edge leaves the meat.

To improve the cleaning effectiveness of the scraper blades 25 even further, while reducing the pressure necessary between the blades and the meat surfaces, the scraping edges 32 on the bent end portions 42 are flexible across the width of the blade at the scraping edge (FIG. 3). This allows each scraping edge 32 to follow the contour of the meat surface without requiring pressures great enough to flatten the meat surface. Less lengthwise flexing of the scraper blades 25 is therefore required (since less pressure is needed for scraping the meat), there is less wear on the scraper blades, and there is less abrasion of the meat surface.

For purposes of sanitation, each scraper blade base portion 30 is carefully fabricated to cooperate with the circumferentially adjacent scraper blades on the same hub to provide large openings 45 between successive blades (FIGS. 2 and 10). Similarly, the blades on adjacent hubs 40 are spaced, when the hubs are joined, to provide large, smooth openings 46 between blades on adjacent hubs (FIGS. 4 and 6). The openings 45 are formed when the blades are molded integrally with the hubs 40, and the openings 46 are formed when the hubs are spin welded together. The openings eliminate unsanitary pockets between the blades 25 and the hubs 40, facilitate cleaning of the scraper blade assemblies 20 and 21, and prevent accumulation of unsanitary residues.

As mentioned earlier, each of the hubs is slightly rotated with respect to an adjacent hub on each of the scraper blade assemblies 20 and 21 in order to define a spiraling series of scraper blades therealong. FIG. 5 demonstrates, however, that the openings 45 in the adjacent hubs 40 are substantially aligned to provide ready access to these openings for cleaning and to prevent the formation of unsanitary pockets between adjacent hubs 40, notwithstanding the spiraling arrangement of the blades.

The doctor blade 35 may be moved in and out of engagement with the scraper blade assemblies 20 and 21 by means of a crank arm 50 having a handle 51 at one end (FIGS. 7-8). Arm 50 is a strip of spring steel, and a pin 52 beneath handle 51 may be withdrawn from openings 53 and 54 by flexing arm 50 for moving the crank arm from the blade engaging position (FIG. 7) to the disengaging position (FIG. 8) and back again. Pin 52 is mounted eccentrically in the base of handle 51, and openings 53 and 54 are elongated so that the pin and handle may be rotated for precise adjustment of the position of the doctor blade as it engages the scraper blades 25 for removing the accumulated residues R therefrom.

The doctor blade 35 is normally moved out of engagement with the scraper blades 25 when the machine is not being used, especially overnight, to reduce blade fatigue and to prevent the blades from taking a set in the deflected position. Surface 57 on doctor blade 35 is smoothly tapered away from the respective scraper blade assemblies 20 and 21 to allow the blades 25 to be restored smoothly and continuously to their extended, unflexed positions. This prevents the blades from suddenly snapping free from the doctor blade 35, thus further reducing fatigue of the blades due to vibrational stresses. Noise is also reduced.

FIGS. 9-12 show the arrangement by which the right hand scraper blade assembly 20 is inserted into machine 10. The left hand assembly 21 is similarly inserted. In FIGS. 9 and 10 the scraper blade assembly stub shaft 60 is inserted through a narrow slot 62 in front wall 63 of the right hand section 11. A larger opening 64 at the end of slot 62 receives a boss 65 on the end of the scraper blade shaft 60 (FIGS. 11 and 12). Thus, when the shaft 60 has been inserted through slot 62 into opening 64, the entire scraper blade assembly 20 may then be moved to the left (FIG. 11) allowing boss 65 to enter opening 64. At the same time the bayonet slotted opening 68 on the scraper blade assembly stub shaft 69 engages the drive shaft 70 for transmitting drive power to the scraper blade assembly 20. The right and left hand members are sized such that the scraper blade assemblies 20 and 21 can be assembled only on the proper side.

As may be seen, therefore, the present invention has numerous advantages. It provides highly effective scraping of the sawed surfaces of a piece of meat, while minimizing fatigue and stress on the scraper blades, and minimizing loss of saleable meat surfaces. The scraper blade structure is easily and inexpensively fabricated and may be readily adapted to a wide variety of meat scraping configurations, from fully automatic meat scraping machines which scrape both sides of a piece of meat, to manual meat scraping. The only requirement is an appropriate means for supporting the scraper blades at their bases. Thus linear (e.g., flat, or belt style) as well as circular scraper blade assemblies may be considered.

While the form of apparatus herein described constitutes a preferred embodiment of this invention, it is to be understood that the invention is not limited to this precise form of apparatus, and that changes may be made therein without departing from the scope of the invention.

What is claimed is:

1. In a meat scraper for scraping residues such as bone dust and meat particles from an essentially planar sawed surface of a cut of meat, said scraper including:

means for guiding a meat cut with the planar surface thereof following a predetermined path, a plurality of scraper elements supported adjacent and covering the entire width of the meat path, each of the elements having a hub, and a plurality of flexible scraper blades extending from each said hub along divergent planes, and means for rotating the elements to bring them into scraping contact with the sawed surface of the meat;

the improvement comprising:

each of the divergent planes of the scraper blades being tangential to said hub and extending in a rearward direction with respect to the normal direction of rotation of said hub, and means on each said blade providing a tip section thereon including a scraping edge which extends forwardly with respect to the remainder of the blade in the normal direction of rotation and presents a thin flat scraping edge which is maintained substantially perpendicular to, and follows the counter of, the surface of the cut of meat during substantially all of the interval when said scraping edge intersects the path of the cut of meat as said hubs are rotated, to cooperate during rotation of said elements to scrape over substantially the entire area of the meat surface moving along said path to remove such residues from the meat surface without substantial abrasion thereof or loss of saleable meat therefrom.

2. The apparatus of claim 1 wherein each said blade has a central body portion which tapers from a thicker section near said hub outwardly to a thinner section.

3. The apparatus of claim 2 wherein at least part of each scraper blade body portion further comprises a part along which the section modulus of elasticity decreases substantially uniformly with distance from said hub to distribute stresses uniformly along said part as said blade flexes when said scraping edge thereof intersects the meat path.

4. In a meat scraper for scraping residues such as bone dust and meat particles from a sawed surface of a cut of meat, said scraper including:
   means for guiding a meat cut with the sawed surface thereof following a predetermined path,
   a plurality of scraper elements supported adjacent and covering the entire width of the meat path,
   each of the elements having a hub, and a plurality of flexible scraper blades extending from each said hub along divergent planes,
   each said blade also having a tip section including a thin flat scraping edge, and
   means for rotating the elements to bring them into scraping contact with the sawed surface of the meat;
   the improvement comprising:
   each of the divergent planes of the scraper blades being tangential to said hub and extending in a rearward direction with respect to the normal direction of rotation of said hub, and said blades and blade tips including integral means for maintaining and extending each said scraping edge forwardly with respect to the remainder of the blade in the normal direction of rotation and substantially perpendicular to the surface of the cut of meat presented thereto during substantially all of the interval when said scraping edge intersects the path of the cut of meat as said hubs are rotated, to follow the contour and scrape over substantially the entire area of the meat surface moving along said path for removing such residues from the meat surface without substantial abrasion thereof or loss of saleable meat therefrom.

5. A method of removing loose particle and residue smears of fat, blood, bone and meat from sawed surfaces of meat to enhance and maintain the general appearance of such surfaces, including the steps of:
   (1) moving a sawed slab of meat in an essentially planar course in a first direction,
   (2) moving a plurality of flexible finger members in an arcuate path on at least one side of said course and in a direction opposite to said first direction, each of said finger members having a thin, meat-contacting scraping edge on one end thereof, and said fingers being positioned and spaced with their edges directed perpendicularly to said meat course, to contact a surface of said sawed slab fully across its width,
   (3) flexing said flexible members by contact with the sawed meat surface to cause their edges to exert pressure against said surface and successively contact the sawed surface to scrape particles and residues therefrom, the relative speeds of movement of the meat slab and members being such that any given transverse line across the meat surface is contacted by a plurality of scraping edges, the improvement comprising:
   (a) supporting each said flexible member at its end remote from its scraping edge in a manner so as at all times to cause the scraping edge to trail behind with respect to its supported end, each said member having a tip adjacent its scraping edge which is directed forwardly at a slight angle with respect to the remainder of said finger member,
   (b) providing for interference of said scraping edges and said meat surface to a depth at which each said tip and scraping edge are generally perpendicular to said meat surface during the scraping thereof to scrape such residue from the meat surface without substantial abrasion thereof or loss of saleable meat therefrom, and
   (c) scooping residues and particles scraped by each scraping edge to lift them from the surface of the meat slab with a minimum of flicking action, said scooping resulting from the combined function of the trailing flexed finger member and the forward direction of its tip as its scraping edge leaves the surface in its arcuate travel.

* * * * *